United States Patent [19]

Van Loom et al.

[11] Patent Number: 4,743,035
[45] Date of Patent: May 10, 1988

[54] SEAL SYSTEM BETWEEN TWO METAL FLANGES

[75] Inventors: Leo Van Loom; Rémy Pilliard, both of Ispra, Italy

[73] Assignee: European Atomic Energy Community (EURATOM), Luxembourg

[21] Appl. No.: 941,000

[22] Filed: Dec. 12, 1986

[30] Foreign Application Priority Data

Dec. 12, 1985 [LU] Luxembourg ............................ 86209

[51] Int. Cl.⁴ ...................... F16J 15/02; F16L 19/02
[52] U.S. Cl. .................................... 277/214; 277/236;
285/110; 285/187; 285/363; 285/917
[58] Field of Search ..................... 277/236, 212 F, 190,
277/101, 152, 214, 167.3, 193; 285/917, 332.2,
363, 110, 328, 223, 187

[56] References Cited

U.S. PATENT DOCUMENTS

| | | | |
|---|---|---|---|
| 1,348,667 | 8/1920 | Snyder | 285/328 |
| 2,937,893 | 5/1960 | Hill et al. | 285/328 |
| 2,981,573 | 4/1961 | Reuter | 277/212 F X |
| 3,176,723 | 4/1965 | Hodgeman et al. | 285/110 X |
| 3,264,005 | 8/1966 | Bialkowski | 277/110 X |

FOREIGN PATENT DOCUMENTS

| | | | |
|---|---|---|---|
| 605339 | 10/1934 | Fed. Rep. of Germany | 285/328 |
| 280931 | 2/1952 | Switzerland | 285/110 |

Primary Examiner—Allan N. Shoap
Attorney, Agent, or Firm—Sughrue, Mion, Zinn, Macpeak, and Seas

[57] ABSTRACT

A seal system between two metal pipes (1, 2) flanges (4, 5) exposed to extreme temperatures, includes at least one elastic annular lip (11, 12) which is held by one of the flanges, with its highest point (10) in contact with the other flange to form a seal line when the flanges are assembled. The lip (11, 12) is an integral part of one of the flanges (4, 5) and it is made by lathing two grooves (13, 14; 17, 18) with one groove (13, 17) radially penetrating the cylindrical surface (15, 19) of the flange, and the other groove penetrating perpendicularly to the former in the flat surface (7, 8) of the flange to define a thinned area (16, 20) between the two grooves to ensure the elasticity of the lip (11, 12).

2 Claims, 1 Drawing Sheet

U.S. Patent
May 10, 1988
4,743,035
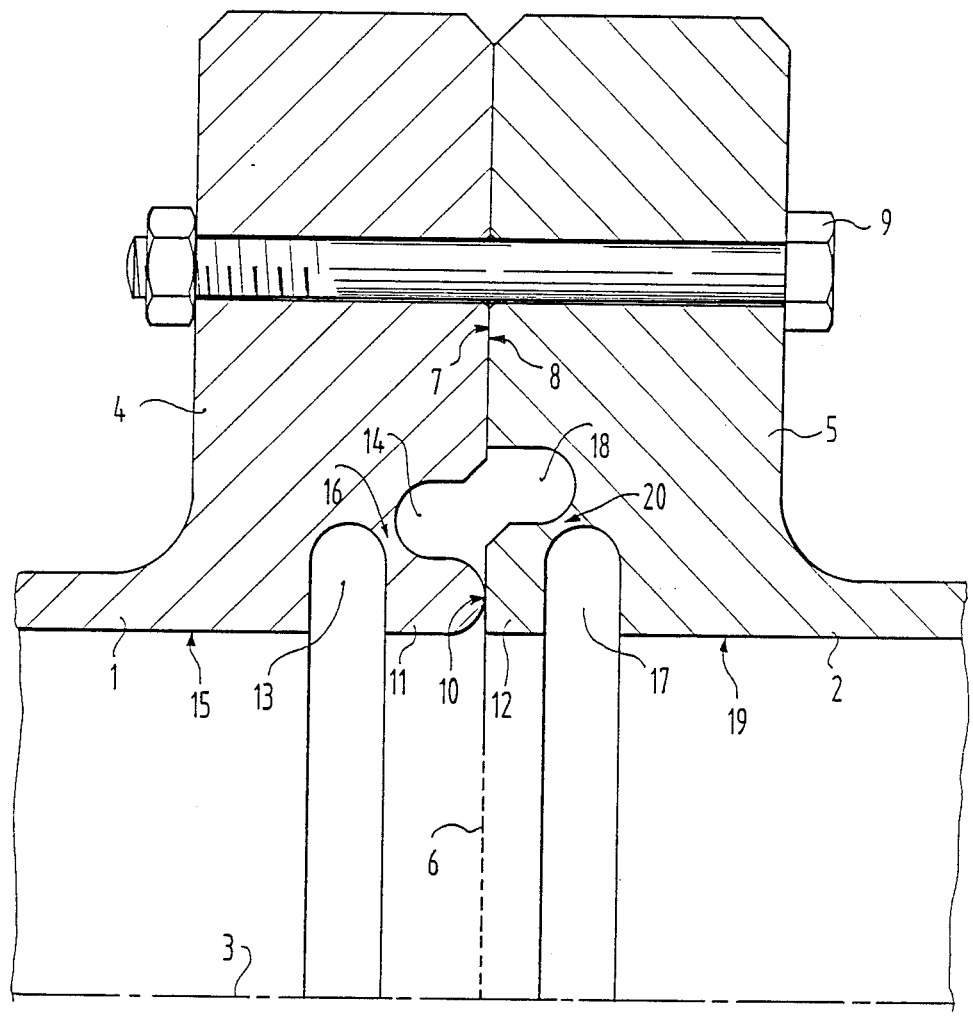

SEAL SYSTEM BETWEEN TWO METAL FLANGES

The invention pertains to a seal system between two metal pipe flanges exposed to extreme temperatures, with this system comprising at least one elastic annular lip, which is held by one of the flanges and, with its high point in contact with the other flange, forms a seal line when the flanges are assembled.

To connect two pipes in a sealed manner, an annular elastic joint is generally inserted between the two flanges. The cross section of this joint is O- or X-shaped, hollow or otherwise, pressurized or bent, and the material from which it is made is chosen so as to be compatible with the temperature and chemical nature of the products carried in the pipes. Under extreme temperature conditions (high or very low temperature) and for aggressive surroundings, the joints are generally made of metal. They are housed in a groove placed in one of these flanges.

On the one hand, good mutual contact between the first flange and the joint and, on the other hand, between the joint and the second flange is critical for a good seal. Thus, all four surfaces must be polished. However, one of the surfaces involved, namely the bottom of the groove, is often made by lathing and is difficult to access to polish properly. Because of this, seal systems of this type are expensive and a flaw in one of the four surfaces mentioned above can cause a leak. Moreover, when two flanges are to be remote coupled, care must be taken so as not to lose the joint.

Thus, the object of the invention is to design a seal system for metal flanges, in which there is a small number of surfaces to be polished and which is better suited for remote connection and disconnection.

This goal is reached according to the invention by a seal system as specified above, which is characterized by the fact that the lip is an integral part of one of the flanges and that it is made by lathing two annular grooves in the associated flange, with one of the grooves radially penetrating the cylindrical surface of the flange and the other penetrating perpendicularly to the former in the flat surface of the flange so that the elasticity of the lip is ensured by a thinner zone between the two areas.

The bottom of at least one of the grooves preferably has a semi-circular cross section for a better stress distribution when the lip elastically bends.

In a preferred embodiment of the invention, two of these lips are provided, with each formed between two grooves placed in the respective flange. Thus, the elasticity of the system is better distributed over the two flanges.

For a univocal distribution of the seal line, it is useful to make the zone of one of the lips opposite the other flange bulged.

Although a symmetrical system in which the location and the depth of the grooves are the same in both flanges can be designed, it is preferable to make the distance between the axis of the flanges and the groove, which is placed in the surface of the flange having the bulged contact area, smaller than the same distance in the other flange and, on the other hand, to make the distance between the seal plane and the groove placed in the cylindrical surface of the flange having the bulged lip greater than the same distance in the other flange.

The invention will be described in greater detail below through the use of a preferred embodiment and drawings, which show a cross section and partial view of two flanges endowed with a seal system according to the invention.

The sole FIGURE shows the ends of the two pipes 1 and 2, which are aligned according to a common axis 3 and which are each equipped with a flange 4 and 5, with the seal plane 6 also able to constitute the plane of contact between the flat surfaces 7 and 8 of the two flanges. Several screw bolts 9 distributed regularly around the axis 3 hold the two flanges in contact when the system is assembled.

When the flanges have a circular cross section, the seal line is a circle located in the plane 6 and shown in the figure by a point 10. This line is defined by the contact between two lips 11 and 12, which are each an integral part of one of the flanges 4 and 5 respectively and which function as a joint.

The first of these lips 11 is made by lathing two annular grooves 13 and 14 arranged in the flange 4, with one of the grooves 13 radially penetrating the cylindrical surface 15 of this flange and the other 14 penetrating perpendicularly to the former in the surface 7 of the plane of the flange, so that a thinner zone 16 between the two grooves ensures the elasticity of the lip 11.

The other lip 12 is also made by lathing two annular grooves 17 and 18 into the flange 5, with one of these grooves 17 radially penetrating the cylindrical surface 19 of the flange 5, and the other 18 penetrating perpendicularly to the former in the surface 8 of this flange so that a thinner area 20 ensures the elasticity of this lip 12. The bottom of the four grooves 13, 14, 17, 18 has a semi-circular cross section so that there is no concentration of stress in the area 16 or 20. Moreover, the quality of the seal does not depend on the precision of the bottom surfaces of the grooves as in the case with prior art.

Of course, the thickness of the zone 16 and 20 depends on the elasticity which is desired for this system and the bending of this zone during assembly. On this subject, it is to be noted that this bending is defined in advance by the distance between the seal plane 6 and the surface 7 or 8 respectively of one of the flanges before assembly.

As the figure shows, the lip 11 of the flange 4 has a bulged section around the point of contact with the other lip, while this other lip is flat in this area. These two areas are the only surfaces to be polished and which are responsible for the quality of the subsequent seal.

The figure also shows that the location of the grooves is different in the two flanges, although a symmetrical configuration is also possible. The distance between the groove 13 and the plane 6 is preferably greater than the distance between this plane and the groove 17. The distance between the cylindrical surface 15 and the groove 14 is also smaller than the distance between the cylindrical surface 19 and the groove 18. Thus, the geometry of the area 16 is different from the geometry of the zone 20, which provides for a better distribution of the elastic bending stresses.

The invention is not limited to the example embodiment according to the figure.

The invention can be made in symmetric form with respect to the plane 6 without departing from the framework of the invention.

Finally, the system can be made with a single lip such as the lip 11 placed in the flange 4, while the flange 5 has only a flat surface opposite this lip.

The cavity formed by the groove 14 or the two grooves 14 and 18 can be connected to a leak detector allowing a leak to be detected well before it is perceptible on the outside.

The system according to the invention does not require any detached parts such as a separate seal joint, and thus is particularly suitable for remote handling. The absence of a separate joint also eliminates the problem of thermal or chemical compatibility for this joint. Finally, the quality of the seal depends only on two areas which are easily accessible and which can thus be tooled without difficulty.

We claim:

1. In a seal system between two end abutting metal pipe (1, 2) flanges (4, 5) exposed to extreme temperatures, said pipe flanges each having a cylindrical inner surface and a flat end surface, said seal system comprising an elastic annular lip (11, 12) carried by each flange, an axial end point (10) of one flange lip in contact with the other flange lip forming a seal line when the flanges are assembled, the improvement wherein;

said lips (11, 12) are integral parts of the flanges (4, 5) and each lip being defined by two grooves (13, 14; 17, 18), including one radial groove (13, 17) radially penetrating the cylindrical inner surface (15, 19) of each respective flange and one longitudinal groove (14, 18) being perpendicular to the one radial groove in the flat end surface (7, 8) of each flange, each lip being attached to its respective flange by a thinned area, the thinned area (16, 20) being between and defined by the two respective grooves defining each lip, the elasticity of the lips (11, 12) being provided by the thinned areas, said lip with said axial end point having a bulged area opposite the other lip with said axial end point being the axial end point of said bulge, the radial distance between the axis (3) of the flanges and the longitudinal groove (14) in the end surface (7) of the flange (4) having the bulged lip (11) is smaller than the radial distance between the axis (3) of the flanges and the groove (18) in the end surface (8) of the other flange (5) and wherein the longitudinal distance between the seal line (6) and the groove (13) in the cylindrical surface (15) of the flange (4) having the bulged lip is greater than the longitudinal distance between the seal line (6) and the groove (17) in the cylindrical surface (19) of the other flange (5).

2. System according to claim 1, characterized in that the bottom of at least one of the grooves (13, 14; 17, 18) has a semi-circular cross section.

* * * * *